Patented Apr. 27, 1954

2,676,947

UNITED STATES PATENT OFFICE 2,676,947

CATECHOLS CONTAINING A SUBSTITUENT IN THE 3-POSITION AS GELATION INHIBITORS IN POLYESTER MIXTURES

Earl E. Parker, Milwaukee, Wis., assignor to Pittsburgh Plate Glass Company, Allegheny County, Pa., a corporation of Pennsylvania No Drawing. Application December 6, 1950, Serial No. 199,554

8 Claims. (Cl. 260—45.95)

The present invention relates to stabilization of polymerizable unsaturated alkyd resins, particularly polyesters of dihydric or other polyhydric alcohol esters of polycarboxylic acids which contain a polymerizable ethylenically unsaturated group, preferably in the alpha beta position and to stable compositions comprising such esters.

An object of the invention is to provide a polymerizable material comprising a polyester of a dihydric alcohol and an ethylenically unsaturated alpha beta dicarboxylic acid or a mixture of such polyester and polymerizable, ethylenically unsaturated compound which is adapted to polymerize, which material is characterized by some, and preferably all, of the following characteristics:

1. In uncatalyzed state, it can be stored for a relatively long period of time.

2. After incorporation of a catalyst, it still can be stored for substantial periods of time, e. g., a day or more at temperatures of about 77 to 100° F. or even somewhat higher without gelling.

3. It will cure rapidly and efficiently when it is heated to proper temperature.

4. It will withstand storage in the catalyzed or uncatalyzed state with a minimum of change or drift in the curing rate.

5. It does not undergo appreciable discoloration during curing or upon aging.

6. It is subject to a minimum of pitting and so-called "ghosting" when it cured upon a base containing certain coloring agents.

It has heretofore been recognized that polymerizable unsaturated alkyd resins, especially polyesters of dihydric alcohols and polycarboxylic acids comprising an ethylenically unsaturated dicarboxylic acid in which the carboxylic groups are linked to one or both of the ethylenic carbon atoms, are capable of polymerization by addition reaction between the ethylenic groups of the polyester to form thermostat products.

It has also been suggested to admix liquid, or at least fusible linear polyesters with polymerizable ethylenically unstaurated compounds often termed "monomers" and to copolymerize the two by heating the mixture in the presence of a peroxide catalyst. This reaction has been extensively elaborated upon in patents such as U. S. Patents 2,409,633 and 2,443,735 to 2,443,741 inclusive, granted to Kropa or U. S. Letters Patent 2,450,552 granted to Hurdis, as well as in numerous other patents and publications. Typical examples of publications are to be found in Industrial and Engineering Chemistry, December 1939, page 1512, and January 1940, page 64.

The foregoing polymerizable compositions undergo addition reaction, that is, reaction at the points of carbon-carbon unsaturation, even at room temperature or thereabouts. This is especially true in the case of copolymerizable mixtures of the polyesters and the ethylenically, or vinylically unsaturated compounds. A polyester of maleic or fumaric acid and a glycol such as propylene glycol or diethylene glycol, in the presence of a vinylic monomer such as styrene, unless inhibited, will begin to gel almost at once. In normal operations, it is customary to promote the final cure of the material by adding a small amount, e. g., 0.05 to 5% or thereabouts, of a catalyst of addition reaction such as benzoyl peroxide, tertiary butyl hydroperoxide and other organic peroxides not specifically a feature of this invention. These catalysts are usually added shortly before the resins are to be cured. Ordinary mixtures containing them will gel very rapidly even at temperatures below the normal curing range.

This strong tendency of the copolymerizable mixtures to set prematurely was early recognized (see Ellis Patent 2,255,313). In the patent, it is proposed to improve this property by incorporating a cellulose as a filler. This, of course, greatly restricts the field of application of the mixtures, since the patented process can be applied only to filled composition.

It has been proposed, for purposes of reducing this tendency of the polymerizable mixtures to gel prematurely during storage and for purposes of assuring reasonable stability after addition of curing catalyst, to add small amounts of organic compounds termed stabilizers that would retard gelation. Many compounds have been so tested. Among these are conventional phenols containing a plurality of hydroxyls. Quinone and tertiary butyl catechol constitute more common members of this class. For some applications, e. g., in the laminating art, they have been accepted as gelation inhibitors, in the absence of better inhibitors, because they do retard gelation in storage. However, they also greatly retard the rate of cure, produce "drift," tend to discolor the resins, produce pitting and ghosting and in the case of more massive castings, they may produce cracking of the finished products. Therefore their field of usefulness is limited.

Accordingly, there has been an extensive search for a gelation inhibitor for mixtures comprising polyesters of dihydric alcohols and ethylenically unsaturated alpha beta dicarboxylic acids which would:

(1) Successfully prevent gelling of an uncatalyzed mixture during reasonably long periods of storage in the uncatalyzed state;

(2) Be effective for a number of hours or even a day or two after addition of peroxide catalysts and at temperatures of 100° F. or even somewhat above;

(3) Have but little effect upon the final cure of the mixtures;

(4) Not cause change or "drift" in the curing characteristics of the mixture during storage; and (5) Would not affect the color of the finished products.

It has now been discovered that catechols which are substituted by a hydrocarbon group in the 3 position meet all of the foregoing requirements unusually satisfactorily. They can be successfully incorporated in small stabilizing amounts with a polymerizable unsaturated alkyd resin such as a polymerizable polyester of ethylenically unsaturated alpha beta dicarboxylic acids and dihydric alcohols or with mixtures of such polyesters and polymerizable ethylenically unsaturated compounds to provide mixtures that are unusually stable both before and after addition of peroxide catalysts of addition reaction. The mixtures are also exceptionally constant in curing characteristics during normal periods of storage. Yet these mixtures cure quite readily when properly heated to form hard, resinous bodies of good color.

Resinifiable mixtures inhibited with hydroquinones, tertiary butyl catechol, quinone or tetrachloroquinone show a large upward drift in curing time. This means that the catalyzed resin requires a longer time to cure after aging than it does when freshly prepared. This forces an operator running a laminating machine or other equipment employed to cure the mixtures to resinous form to re-adjust the time cycle of operations frequently in order that a properly cured product may be obtained. In some cases it may even be impractical to employ the copolymerizable mixtures because of the sharp variations in the curing time thereof. The ideal inhibitor would permit a substantially constant rate of cure in the polymerizable material over a long period of time. The 3-alkyl substituted catechols and particularly 3-isopropyl catechol are singularly effective in this regard. Such change or drift in curing time as may occur in mixtures containing them is usually toward a lowering of the time. This is not particularly objectionable, since it can never result in undercuring of the product.

Obviously compounds that impart color to the resin products are also undesirable as inhibitors. The quinones, for example, color the resin both before and after cure. Some of the inhibitors react in the presence of peroxide catalysts to produce colored material of varying stability during cure of the resin. Catechol, for example, produces a brown color that does not completely fade during the cure. Many of the substituted catechols produce colors, varying from pale yellow to pink, that are almost completely destroyed when the resin is cured and are therefore satisfactory from the viewpoint of discoloration.

Another objectionable feature attending the use of some inhibitors consists in so-called pitting and ghosting effects. These terms deal with appearance of a laminate in which the ink used to color the reinforcing material disturbs the normal uniform curing process of the resin in contact therewith. Pitting appears as a series of small bubbles over the colored regions while ghosting refers to slight surface distortions over printing areas. Both are apparently due to different degrees of interference of the coloring matter with the cure of the resin. In any event, both are strongly affected by the nature of the inhibitor used in the resins. Catechol and 4-chlorocatechol are examples of inhibitors that induce ghosting and pitting. The 3-alkyl substituted catechols are unusually successful as inhibitors with respect to pitting and ghosting.

It is obviously desirable that the time of cure of the copolymerizable mixture be as short as possible but that the storage life of the catalyzed mixture be as long as possible. The 3-alkyl substituted catechols have now been found to be superior to any of the conventional phenolic compounds tested in this respect. Mixtures containing them as inhibitors cure within a relatively short time and simultaneously a long tank life is attained.

It is further desirable that the copolymerizable mixtures should be storable over long periods of time without substantial change in the curing characteristics thereof. Many inhibitors of gelation, especially the quinones, are subject to destruction in the copolymerizable mixture during a period of storage and there is a fairly rapid change in the properties of the resin in which they are used for storage at room temperatures. Numerous tests clearly show that the catechols containing a hydrocarbon group in the 3 position are usually satisfactory and reliable in this respect.

Other dihydric phenols including some catechols have a stabilizing effect in the polymerizable materials herein disclosed, but in general, the catechols containing a hydrocarbon group such as an aliphatic hydrocarbon group in the 3-position are superior to those containing corresponding groups in other positions. The 3-substituted compounds have minimal effect upon the rate of cure and mixtures containing them are exceptionally constant as to rate of cure.

Naturally, there is some variations as to the value of the several members of the class, but all possess valuable gelation inhibiting characteristics in the compositions comprising the polyesters or copolymerizable mixtures of such polyesters and polymerizable ethylenically unsaturated compounds. Accordingly, they are all regarded as falling within broader concepts of the invention. However, at the present time, 3-isopropyl catechol is regarded as being, for most purposes, substantially superior to the other members of the class. The 2-substituted isopropyl catechol apparently constitutes a new chemical compound which probably possesses numerous important properties in addition to its suitability for use as a gelation inhibitor.

The 3-substituted catechols contemplated according to this invention have the following structure:

where R is a group consisting wholly of hydrogen and carbon, the number of carbon atoms even when the group contains an aromatic radical rarely exceeding 10 and, in the case of a straight aliphatic chain having no aromatic groups, rarely exceeding 5. The following are typical compounds useful according to this invention:

TABLE A 3-methyl catechol
3-ethyl catechol
3-n-propyl catechol
3-isopropyl catechol 3-n-butyl catechol
3-isobutyl catechol
3-secondary butyl catechol
3-hexyl catechols and isomers involving rearrangement of the methyl groups in the side chain
3-octyl catechol and its isomers involving rearrangement of the methyl groups in the side chain
3-n-amyl catechol and the various isomers thereof
3-alpha phenethyl catechol and others The 3-hydrocarbon substituted catechols in which the α carbon atom of the side chain is joined to at least 1 hydrogen atom appear to give best results. However, those compounds in which all hydrogens on the α carbon atom are replaced by hydrocarbon radicals may, in some instances, also be employed as gelation inhibitors. The preferred compounds would appear to be of the formula:

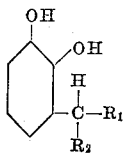

where $R_1$ is hydrocarbon and $R_2$ is hydrogen or hydrocarbon. The total number of carbon atoms in the side chain will usually be in the range of 1 to 8 or 10.

Most of the catechols containing a hydrocarbon substituent in the 3-position are new compounds. While they are in general valuable gelation inhibitors in the polymerizable compounds and mixtures herein disclosed, 3-isopropyl catechols is regarded as being of outstanding merit.

Various methods can be employed in preparing these catechols.

One method of preparing 3-isopropyl catechol comprises condensing catechol and isopropyl alcohol. The reaction is represented by the equation:

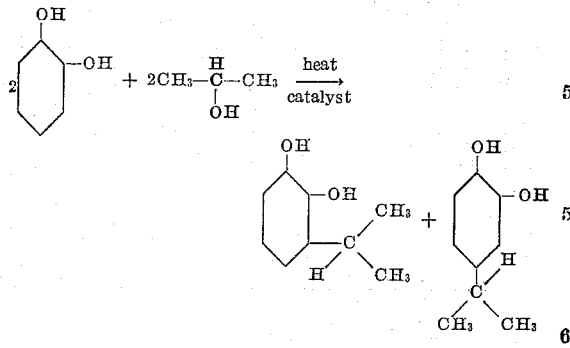

The 4-isopropyl catechol can be separated by distillation.

In an example illustrating the application of this procedure, the apparatus comprised a three neck, 12 liter glass flask equipped with a mechanical agitator, a water cooled reflux condenser and a thermometer. It was also provided with an appropriate heating device such as an electrical resistance element or a gas burner.

A charge for the apparatus comprised:

|  | Grams |
|---|---|
| Catechol | 4125 |
| Isopropl alcohol | 2250 |
| Sulfuric acid (60%) | 5762 |

The catechol and water were added first, and finally the sulfuric acid was added.

The mixture was heated during agitation to 95° C. and the heat was turned off. Reaction began and the temperature rose exothermically to a range of 105 to 110° C. During the first hour there was some evolution of volatile material but after that, there was but little refluxing. The temperature was held at about 105° C. for a total of 4 hours.

The mixture was agitated to prevent stratification of the mixture into liquid layers during the entire period of treatment.

At the end of the reaction period, the mixture was allowed to separate into two layers and the bottom layer was drained away and discarded. The top layer was washed thoroughly with 2 liters of cold water and then sodium hydroxide of 10% by weight concentration was added until residual free sulfuric acid was neutralized. A bottom layer, presumably of water and salts again formed and was mechanically separated.

The organic layer was freed of water by heating it at atmospheric pressure until a temperature of 150° C. was attained. The residue was cooled.

The product was then vacuum distilled, a small forerun being discarded and then the main part of the material was distilled until a tar-like residue remained in the still pot. In this operation 3 to 4 liters of distillate were distilled over, the distillate being cut into 4 equal fractions.

The fractions were allowed to stand overnight and some catechol was found to crystallize from the first 2 cuts. The liquid phase of each of these fractions was drained off and the fraction combined and carefully fractionated under vacuum. A small amount of catechol isopropyl ether came over first and this was followed by catechol boiling in its appropriate range. Subsequently 3-isopropyl catechol boiling in the range 170–175° C. at 50 millimeters (absolute pressure) was distilled. This material is a solid which melts in the range of 50 to 51° C.

General methods of preparing 3-substituted catechols involve the use of 2,3-dimethoxybenzaldehyde as a starting material.

If addition of a single hydrocarbon group to the side chain is sufficient, the product of Grignard reaction can be hydrolyzed to form the corresponding derivative of 2,3-dimethoxy benzyl alcohol. The hydroxyl can be eliminated by dehydration to form a 2,3-dimethoxy styrene. The ethylenic group can be hydrogenated and the resultant 3 hydrocarbon substituted 2,3-dimethoxy benzene can be treated with hydrobromic acid to break the oxy linkages and form 3 hydrocarbon substituted catechol.

The following equations illustrate the application of the reaction when a single Grignard reaction is required; namely, to the preparation of 3-ethyl catechol:

Step A

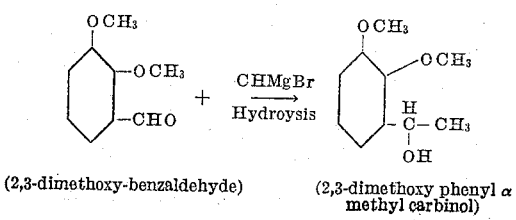

(2,3-dimethoxy-benzaldehyde)    (2,3-dimethoxy phenyl α methyl carbinol)

Step B

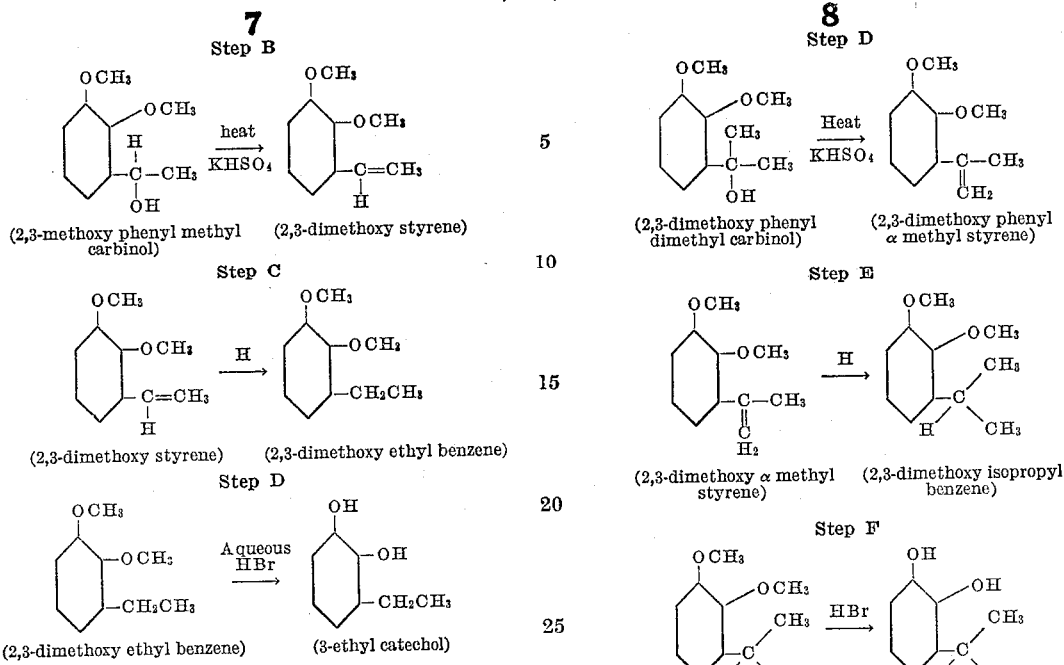

(2,3-methoxy phenyl methyl carbinol) → (2,3-dimethoxy styrene), heat, KHSO₄

Step C (2,3-dimethoxy styrene) → (2,3-dimethoxy ethyl benzene), H

Step D (2,3-dimethoxy ethyl benzene) → (3-ethyl catechol), Aqueous HBr

Many other 3-substituted catechols can be prepared by the same reaction by substitution of other halogen substituted hydrocarbons in the reaction.

The following equations illustrate an extension of the reaction wherein the intermediate containing a hydroxylated side chain as obtained by hydrolysis of the product of Grignard reaction is subjected to oxidation to form a ketone that can undergo further Grignard reaction to provide side chains of increased molecular weight. This operation can be repeated to build up many side chains wherever keto groups can be formed in a side chain. This type of reaction is illustrated by the preparation of 3-isopropyl catechol.

The 3-isopropyl catechol and other 3-substituted catechols can be prepared from 2,3-dimethoxybenzaldehyde, a known compound, by the following reactions:

Step A

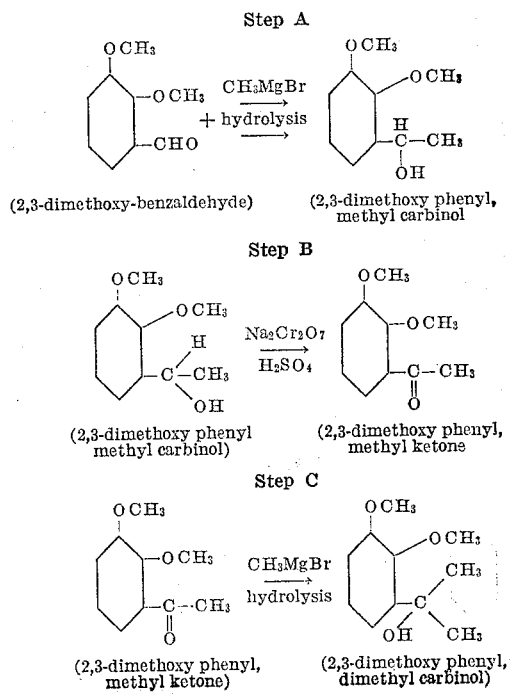

(2,3-dimethoxy-benzaldehyde) → (2,3-dimethoxy phenyl, methyl carbinol), CH₃MgBr + hydrolysis

Step B (2,3-dimethoxy phenyl methyl carbinol) → (2,3-dimethoxy phenyl, methyl ketone), Na₂Cr₂O₇ / H₂SO₄

Step C (2,3-dimethoxy phenyl, methyl ketone) → (2,3-dimethoxy phenyl, dimethyl carbinol), CH₃MgBr hydrolysis

Step D (2,3-dimethoxy phenyl dimethyl carbinol) → (2,3-dimethoxy phenyl α methyl styrene), Heat KHSO₄

Step E (2,3-dimethoxy α methyl styrene) → (2,3-dimethoxy isopropyl benzene), H

Step F (2,3-dimethoxy isopropyl benzene) → (3-isopropyl catechol), HBr

The following are specific illustrative examples of the above mentioned process:

3-ethyl catechol

A 3-neck, 1 liter glass flask provided with an agitator, a dropping funnel and a water cooled reflux condenser having a terminal calcium chloride drying tube, was employed.

As a preliminary operation, magnesium methyl iodide was prepared as follows: In the flask were placed 27 grams of magnesium and 200 milliliters of diethyl ether. 142 grams of methyl iodide was added through the dropping funnel over a period of 70 minutes. At the conclusion of this time, the temperature of the mixture in the flask had risen exothermally to 75° C. At this point, a 100 milliliter portion of benzene was added and the mixture was allowed to stand for 40 minutes, at the conclusion of which time the temperature had dropped to 36° C.

STEP A

In this step 2,3-dimethoxy methyl carbinol was prepared as follows: A 125 gram portion of 2,3-dimethoxy-benzaldehyde dissolved in 200 cc. of benzene was added to the magnesium methyl iodide in the flask over a period of 1 hour. At the conclusion of this period, the temperature of the reaction mixture was 65° C. The mixture was stirred for an additional hour, and then was poured onto ice and the pH of the aqueous layer was adjusted to 7. The intermediate product 2,3-dimethoxy, 3α-hydroxy ethyl, benzene was formed.

STEP B

The 2,3-dimethoxy phenyl methyl carbinol obtained was converted to 2,3-dimethoxy styrene as follows: The organic layer was mechanically separated from the aqueous layer and the latter layer was extracted with a 200 milliliter portion of benzene. The benzene extract solution was added to the organic layer in a round bottom flask and was blown with inert gas (e. g., CO₂) while it was heated to 140° C. A 20 gram portion of potassium hydrogen sulfate was added to the mixture at this point and the mixture was heated at 210 to 200° C. for 20 minutes. The heating operation was conducted under a reflux condenser designed azeotropically to remove water from the system and return benzene to the system. A total of 7.5 milliliters of water was collected. The organic material was distilled under vacuum and 31.31 grams of 2,3-dimethoxy styrene was collected in 4 cuts. The third cut had a boiling point of 93° C. at 5 millimeters. The refractive index was $N_D^{25}=1.5485$.

STEP C

The 2,3-dimethoxy styrene was converted to 2,3-dimethoxy ethyl benzene as follows: All 4 cuts of the 2,3-dimethoxy styrene were placed in shaking type bomb or autoclave lined with stainless steel liner of 1 liter capacity and 5 grams of a hydrogenation catalyst, namely 5% palladium on carbon as a carrier and 200 milliliters of isopropyl alcohol was added. Air was purged from the system with hydrogen. The mixture was then shaken at 71° C. while under hydrogen gas at a hydrogen pressure of 300 pounds gauge. Hydrogenation was continued overnight or for about 14 to 18 hours. The liquid phase was separated from the catalyst and the liquid phase was carefully distilled. Three fractions having a boiling range of 75 to 85° C. at 5 millimeters (absolute pressure) were collected. The middle fraction had a boiling point of 83° C. at 5 millimeters and a refractive index of $N_D^{25}=1.5099$. This material was 2,3-dimethoxy ethyl benzene.

STEP D

To convert the 2,3-dimethoxy ethyl benzene to 3-ethyl catechol, the three fractions were placed in a 1 liter round bottom flask, along with 200 grams of 48% aqueous hydrobromic acid and 300 grams of acetic acid. The mixture was refluxed under atmospheric pressure for 24 hours and was then blown with inert gas ($CO_2$) until a temperature of 130° C. was attained. A 200 cc. portion of n-butyl alcohol was added to the liquor and the mixture was washed with dilute caustic until a pH of 6 was attained. The organic layer was separated and distilled under vacuum. Four cuts boiling in the range of 113 to 125° C. at 5 millimeters (absolute) pressure were taken. These cuts were of desired product, namely 3-ethyl catechol that can be employed as a gelation inhibitor in mixtures of ethylenically unsaturated compounds and polyesters of $\alpha\beta$-carboxylic, ethylenically unsaturated acids.

The preparation of other typical 3-substituted catechols through a process that involves a single Grignard reaction were similarly conducted.

3-n-propyl catechol

The apparatus was as previously described for the preparation of 3-ethyl catechol. 2,3-dimethoxybenzaldehyde and ethyl magnesium bromide which was prepared in the same way as methyl magnesium bromide were conducted through the series of steps A, B, C and D described in connection with the preparation of 3-ethyl catechol.

1-n-propylene 2,3-dimethoxy benzene boiling at 101° C. at a pressure of 3 millimeters (absolute), refractive index $N_D^{25}=1.5502$ and 1-n-propyl 2,3-dimethoxy benzene boiling at 85° C. at 3 millimeters (absolute) and of a refractive index of $N_D^{25}=1.5054$ were formed as intermediates in the process. The latter was converted into 3-n-propyl catechol by hydrobromic acid, the procedure outlined in Step D above.

The 3-n-propyl catechol had a boiling point of 123° C. at a pressure of 5 millimeters (absolute). The product melted within a range of 69 to 74° C.

3-isobutyl catechol

This compound (3-isobutyl catechol) can be prepared from isopropyl magnesium chloride and 2,3-dimethoxybenzaldehyde. The apparatus suitable for the reaction is the same as described for the preparation of 3-ethyl catechol and the same procedural steps, A, B, C and D, are followed. In the reaction, 1-isobutenyl-2,3-dimethoxybenzene boiling at 108° C. under 5 millimeters (absolute) pressure, refractive index 1.5371 and 1-isobutyl-2,3-dimethoxybenzene boiling at 98° C. under a pressure of 5 millimeters (absolute) and of a refractive index of 1.5009 are produced as intermediates. The latter is converted to 3-isobutyl catechol by the action of hydrobromic acid (Step D). The 3-isobutyl catechol is a solid which boils at 123° C. under a pressure of 5 millimeters (absolute) and melts at 61 to 64° C.

3-n-amyl catechol

Similarly, 3-n-amyl catechol was prepared by the reaction of n-butyl magnesium chloride and 2,3-dimethoxybenzaldehyde, the apparatus being the same as for the preparation of 3-ethyl catechol from methyl magnesium chloride and 2,3-dimethoxybenzaldehyde. As intermediates 1-n-amylene-2,3-dimethoxybenzene boiling at 128° C. at 5 millimeters pressure (absolute) and of a refractive index of 1.5358 and 1-n-amyl-2,3-dimethoxybenzene boiling at 117° C. under a pressure of 5 milliliters (absolute) and refractive index of 1.5007 were formed. The latter was converted to 3-n-amyl catechol by the action of hydrobromic acid, the procedure of Step D being followed. The 3-n-amyl catechol was of a boiling point of 145° C. under a pressure of 5 millimeters (absolute). The melting point was 38 to 43° C. It can be employed as a gelation inhibitor in polyesters of glycols and $\alpha\beta$ ethylenic dicarboxylic acids or mixtures thereof with ethylenically unsaturated compounds.

The preparation of 3-substituted catechols by a process involving repetition of the Grignard reaction to add a plurality of hydrocarbon groups to the 1 carbon atom of 2,3-dimethoxybenzaldehyde is illustrated in the preparation of 3-isopropyl catechol.

3-isopropyl catechol

In the process a 5 liter round bottom flask was provided with a stirrer, a thermometer and a reflux condenser which preferably was chilled by Dry Ice and isopropyl alcohol. In order to prepare magnesium methyl chloride, 108 grams of magnesium and 1000 cc. of anhydrous ether, and 204 grams of methyl chloride were added. Subsequently 1000 cc. of benzene was added.

To this mixture a solution of 580 grams of 2,3-dimethoxybenzaldehyde in 1000 cc. of benzene was added at 60° C. The mixture was left to stand overnight and was then hydrolyzed by being poured upon ice. The product formed 2,3-dimethoxy methyl carbinol, most of which collected as an oil layer. The resultant water layer was acidified with a strong acid and was then extracted twice with toluene.

STEP A¹

The extract and the oil layer were combined and the solution of 2,3-dimethoxy methyl carbinol was gradually added to a mixture of 294 grams of potassium dichromate and 334 grams of concentrated sulfuric acid in 2000 cc. of water. The addition was attended with cooling and was so adjusted that the temperature was maintained under 40° C.

Some free 2,3-dimethoxy phenyl methyl carbinol remained in the reaction mixture, as was evidenced by the liberation of water when a small sample of the mixture was distilled. To convert this compound to the corresponding ketone, 2 additional portions of potassium dichromate and sulfuric acid, constituting 5% by weight of the total mixture of potassium dichromate and sulfuric acid and made up in the proportions above described were added.

The completion of the reaction was determined by distillation of small portions of the reaction mixture. When water ceased to form in such distillations, as a result of the dehydration of carbinol, the reaction was regarded as complete.

The organic layer from the reaction was separated and the water layer was extracted twice with butyl alcohol. The organic layer and the extract solutions were combined and neutralized to a pH value of 7 and were then blown with inert gas ($CO_2$) until a temperature of 150° C. was attained in the mixture.

The product of this reaction was 2,3-dimethoxy phenyl methyl ketone which was purified by careful distillation. The product was fractionated.

Using the fraction boiling in the range of 120-128° C. under 5 millimeters pressure and containing the 2,3-dimethoxy phenyl methyl ketone, was selected for further treatment by the same sequence of Steps A, B, C, D, described for treatment of 2,3-dimethoxy benzaldehyde.

*3-secondary butyl catechol*

In the reaction 2,3-dimethoxy phenyl ethyl ketone was prepared from ethyl magnesium bromide and 2,3-dimethoxybenzaldehyde by the method explained for the making of the corresponding methyl ketone from 2,3-dimethoxybenzaldehyde and methyl magnesium bromide. 2,3-dimethoxy phenyl ethyl ketone boiled at 136° C. under a pressure of 7 millimeters (absolute) and at a refractive index of 1.5269.

In order to prepare 3-secondary butyl catechol, the 2,3-dimethoxy phenyl ethyl ketone was treated as a starting material. The latter compound was reacted with methyl magnesium iodide in accordance with the method employed in treating 2,3-dimethoxybenzaldehyde. The product then hydrolyzed to form 2,3-dimethoxy phenyl methyl ethyl carbinol. This compound was cracked to form 2,3-dimethoxy α ethyl styrene by dropping it into a column of 1 inch diameter and 2 feet length and being packed with Berl saddles. The column was heated to 275 to 300° C. One to 2 volumes of water was also added along with the 2,3-dimethoxy phenyl methyl ethyl carbinol in order to flush out the 2,3-dimethoxy α ethyl styrene. The latter compound was collected at the bottom of the column in a flask containing a small amount of hydroquinone as a polymerization inhibitor.

The crude intermediate (2,3-dimethoxy α ethyl styrene) was then reduced with hydrogen as above described to form 2,3-dimethoxy secondary butyl benzene, 5 grams of conventional nickel oxide catalyst being employed to promote reaction. The 2,3-dimethoxy secondary butyl benzene was treated with hydrobromic acid to form the desired 3-secondary butyl catechol. The latter boils at 108-113° C. at 5 millimeters absolute.

Small effective amounts of a 3-substituted catechol for use as gelation inhibitors in ethylenically unsaturated polyesters and mixtures of such esters and polymerizable ethylenic compounds would be approximately within the range of .01 to 1% by weight of the polymerizable mixture.

The preparation of polyesters of dihydric alcohols and ethylenically unsaturated alpha beta dicarboxylic acids which can be stabilized by 3-substituted catechols follows conventional procedures. Normally the dihydric alcohol and the acid or its anhydride with or without additions of polycarboxylic acids such as dicarboxylic acids having no ethylenic or other forms of reactive unsaturation or monocarboxylic acids are reacted with a dihydric alcohol.

Various acids including ethylenic unsaturation and alpha beta dicarboxylic groups may be esterified with dihydric alcohols to provide polyesters and are contemplated as being within the scope of the invention. Representative members of the class are as follows:

TABLE B

Maleic acid
Fumaric acid
Aconitic acid
Mesaconic acid
Citraconic acid
Ethyl maleic acid
Pyrocinchoninic acid
Xeronic acid
Itaconic acid
Carbic acid and others The chlorine substituted derivatives of the acids, e. g., chloromaleic acid, are also contemplated. The anhydrides of these acids where anhydrides exist, of course, are embraced under the term "acid," since the reaction products or polyesters of the anhydrides are the same as those of the acids per se. Often it is preferable to operate with the anhydride rather than the free acid. All of the acids are di- or tricarboxylic. Most of them include an ethylenic group in alpha relation to at least one carboxyl. That is, they include the group:

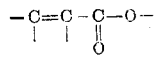

The acid or anhydrides which are alpha beta ethylenic, alpha beta dicarboxylic are especially desirable but the invention is not restricted solely to these.

Dihydric alcohols that can be esterified with any of the foregoing acids comprise the following:

TABLE C

Ethylene glycol
Diethylene glycol
Triethylene glycol
Polyethylene glycol
1,3-trimethylene glycol
1,2-propylene glycol
Dipropylene glycol
Butylene glycol
Styrene glycol C. halogen substituted dihydric alcohols, e. g., monochloro derivatives, are contemplated.

It will be appreciated that the ethylenically unsaturated acids provide double bonds which are capable of reacting by addition with ethylenic compounds often termed monomers, or even with themselves. Usually, an adequate number of points of unsaturation in the polyester molecules can be attained, even though substantial amounts of the ethylenically unsaturated acids are replaced by other dicarboxylic acids which are free of ethylenic unsaturation or other forms of unsaturation which are adapted to react by addition. Obviously in this latter type of acid, the principal functioning groups are the carboxyls that react by esterification. Such acids in the polyester add to the length of the polyester molecules but they do not cross link the molecules at points intermediate therein by addition with other compounds or molecules. Often such ethylenically saturated dicarboxylic acids improve the properties of the resins in which they are introduced. The dicarboxylic acids free of ethylenic unsaturation, of course, are not required in all cases and therefore it is impracticable to set a minimum as to the amount of such acids that may be incorporated with the ethylenically unsaturated alpha beta dicarboxylic acids in forming the esters. A minimum of .25 mole per mole of the ethylenically unsaturated acid is suggested, since it is believed that if the proportion of the acid free of ethylenic unsaturation is reduced much below this point, it will not exert any great effect in the polyester molecule. The proportion of the acid free of ethylenic unsaturation may be increased to 6 or even 8 or 10 moles per mole of the unsaturated acid to provide polyesters which are still capable of cross linking at points of unsaturation.

Examples of appropriate dicarboxylic or tricarboxylic acids which are free of ethylenic and acetylenic unsaturation are tabulated as follows:

TABLE D
1. Phthalic acid
2. Tetrachlorophthalic acid
3. Succinic acid
4. Adipic acid
5. Suberic acid
6. Azelaic acid
7. Sebacic acid
8. Dimethyl succinic acid Chlorinated derivatives of acids 1, and 3 to 8 inclusive of the above list are not precluded. For purposes of the present invention, aromatic nuclei of such acids as phthalic acid are regarded as saturated, since the double bonds do not react as to addition of ethylenic groups. The term "acid," as it occurs in Table D, includes the anhydrides of such acids as form anhydrides. Mixtures of any 2 or more of the acids of Table D are contemplated. The proportions of the acids in such mixtures may be equimolar or any other convenient proportion.

It is sometimes desirable to include in the polyester molecule a monobasic acid component such as a free fatty acid of a glyceride oil. Fatty acids of drying oils are especially suitable, since they impart air drying characteristics to the polyester. However, other monobasic acids may also be included. The oil monobasic acids may be employed in amount of about 1 or 2 moles for each 10 or 12 moles of the dicarboxylic acids. Appropriate aliphatic acids for use in the process are represented by the following table:

TABLE E
Linolenic acid
Linoleic acid
Eleostearic acid
Octadecatrienoic acid
Clupanodonic acid
Acetic acid
Propionic acid Mixtures of these acids are contemplated.

Proportions of the several constituents of the polyester may be summaried as follows:

| | |
|---|---|
| Ethylenically unsaturated di-carboxylic acids. | 2 to 12 moles. |
| Acids free of ethylenic unsaturation | 2/5 to 144 moles. |
| Drying oil acid or other mono-carboxylic acid, optional but if present. | 2 to 12 moles of the other acids. |
| Dihydric alcohol | usually equivalent to or in slight excess of the several acid components of the polyester. However, large excesses or deficiencies of alcohol may be used. |
| Monohydric alcohol such as ethyl, methyl, propyl, butyl, allyl, lauryl, oleyl, benzyl, alcohols, etc. | Optional. Amounts rarely exceeding 1 mole of monohydric per mole of dihydric alcohol. |

In the preparation of the polyesters, the alcohols such as those enumerated in Table C are usually employed in approximately molar equivalency or slightly in excess of such equivalency, e. g., 10 or 20% excess of the one or more acid components of the polyester.

The monocarboxylic acid component is merely added to the mixture of dihydric alcohol and dibasic acids and the mixture is heated as previously described.

In conducting the esterification, of the dihydric alcohol and the acid or acids, conventional principles of esterification are adhered to. For example, acid catalysts may be added to promote the reaction. The reaction may also be conducted under an atmosphere of carbon dioxide or nitrogen gas. Xylene or other non-reactive solvent may be included in the reaction mixture. It is refluxed during the course of the reaction, but ultimately it is distilled off.

The temperature of reaction is such that water of esterification is evolved and the reaction is continued until such water ceases to evolve and the acid value of the sample is reduced to a reasonably low figure, e. g., 5 to 50. It should not be continued so long as to result in the formation of an infusible, insoluble polyester. Usually a temperature of 150 to 190 or 200° C. may be attained in the reaction. The reaction can usually be completed within 2 to 20 hours. It should be discontinued before an infusible polyester is formed.

The polyesters are per se capable of polymerization by addition reaction between the double bonds in the molecule. To effect such addition reaction, it is preferable to add a catalyst of addition such as benzoyl peroxide or tertiary butyl hydroperoxide or the like organic peroxide catalyst to the polyester. These catalysts may be added in appropriate amount, e. g., 0.1 to 5% by weight of the polyester. Naturally if the polyesters are to be employed without addition of a polymerizable ethylenically unsaturated compound such as enumerated in Table F, which is to follow, the 3-substituted catechol compound from Table A is merely added to the polyester in appropriate amount, e. g., 0.001 to 1%, based upon the total amount of polymerizable components present. This may be effected by simple addition of the catechol compound to the polyester while it is hot, for example at a temperature of 100 or 150° C. The inhibitor compound is effective in preventing subsequent gelation of the polyester.

In most instances, the polyesters are admixed with an appropriate ethylenically unsaturated compound which contains one or more of the aliphatically unconjugated polymerizable groups

linked to a negative radical such as a benzene nucleus, halogen carboxyl radical or the like.

Such mixtures are much more reactive than the simple polyesters per se. The stabilization of these mixtures, therefore, is more urgent than that of the polyester. Copolymerizable mixtures may comprise any of the polyesters previously referred to. Polyester may be incorporated with vinylically unsaturated monomers such as those referred to in the patents previously mentioned.

The polymerizable ethylenically unsaturated compounds (monomers) may comprise any of the common ethylenic compounds capable of copolymerizing with unsaturated polyesters. Preferably such compounds are liquids and, at the temperature of copolymerization are soluble in or compatible with the polyester.

The following include some of the representative monomers:

TABLE F

1. Styrene
2. α-methyl styrene
3. p-methyl styrene
4. Divinyl benzene
5. Indene

Unsaturated esters such as:

6. Vinyl acetate
7. Methyl methacrylate
8. Methyl acrylate
9. Allyl acetate
10. Diallyl phthalate
11. Diallyl succinate
12. Diallyl adipate
13. Diallyl sebacate
14. Diethylene glycol bis(allyl carbonate)
15. Triallyl phosphate
16. Esters such as those of monohydric or polyhydric alcohols (methyl, ethyl, propyl, allyl, methallyl, vinyl) and an unsaturated polymerizable monocarboxylic acid (acrylic, methacrylic, chloroacrylic)
17. Other esters of monohydric unsaturated alcohols (allyl, vinyl, methallyl, 2-chloroallyl, crotyl) and mono- or polycarboxylic acids (acetic, propionic, succinic, etc.)
18. Esters of α,β-unsaturated dicarboxylic acids (maleic, fumaric, itaconic) and monohydric alcohols (methyl, ethyl, propyl, isopropyl, amyl)

Many of these vinylic compounds, including the syrupy mixtures of monomer and polymer may be combined with any of the polyesters prepared from compounds B, C, D and E previously described. Mixtures of any two or more of the foregoing vinylic compounds and the polyesters are contemplated.

The vinylic or ethylenically unsaturated compound or monomer usually comprises from 10 to 60% upon a weight basis of the copolymerizable mixtures, and mixtures containing 20 to 40 or 50% by weight of the unsaturated vinylic compound are to be preferred.

To formulate a stabilized or non-gelling mixture of (1) an unsaturated polyester of a dihydric alcohol and an acid comprising a dicarboxylic ethylenically unsaturated acid and (2) a vinylic compound, it is usually preferred to dissolve the 3-hydrocarbon substituted catechol in all or a portion of the ethylenically unsaturated compound or monomer component. In case it is added to a portion only of the compound, this portion is added to the polyester cmponent first. The temperature of mixing of the polyester should be sufficiently low to obviate premature polymerization. A temperature of 120° C. or below is usually safe.

The 3-substituted catechol may be employed in any appropriate stabilizing amount, for example about 0.01 to 2% by weight of the ultimate mixture of polymerizable components.

The mixtures of polyesters and vinylic compounds can be stored for long periods of time without any substantial tendency to gel. When it is desired to employ the mixtures in the preparation of resins in castings, laminations or the like, a cure may be effected by heating the uncatalyzed mixture sufficiently long at an adequate temperature, or the mixtures may be exposed to irradiation by ultraviolet light. However, it is usually preferable to effect the cure by adding appropriate organic peroxide catalyst and then heating the mixture to polymerization temperature. Appropriate catalysts include benzoyl peroxide, tertiary butyl hydroperoxide, cyclohexyl hydroperoxide, acetyl peroxide, lauroyl peroxide and others. These catalysts may be added in amounts of .01% or even up to 5% by weight. Approximately 1% by weight is usually satisfactory. The peroxide catalyst should be stirred into the copolymerizable mixture in conventional manner. If desired, the catalyst may be diluted with styrene or xylene or other convenient solvent. The catalyst will usually be added at as short a period as practical before it is desired to effect cure of the copolymerizable mixture. However, as previously indicated, it is sometimes necessary to store the catalyzed mixture for several hours or even a day or two before the ultimate curing operation. Sometimes this storage may be at temperatures up to 100° F. or even slightly above. It has previously been pointed out that the mixtures stabilized with the 3-substituted catechols herein disclosed successfully withstand such storage and during such period of storage as well as any previous storage of the mixture in uncatalyzed state, changes as to ultimate curing rate of the mixture are slight, as compared with mixtures stabilized with conventional phenolic compounds.

When it is desired to cure the resins which have been stabilized and catalyzed in accordance with the provisions of the present invention, they are introduced into appropriate molds or applied to a fabric or fibrous base or other appropriate base or filler as in conventional coating or laminating operations. The cure can be effected by moderate heating of the copolymerizable mixture to a temperature of about 75 or 100° C. or below until the mixture has adequately gelled. Gelling may be at relatively low temperatures, e. g., 22° C. or thereabouts, if time is unimportant in the operation. It is preferred to harden the gelled resin by heating it to 125 or 150° C. or thereabouts. High temperatures of initial gelling and curing are permissible, but due care should be observed not to raise the temperatures so high as to volatilize the ethylenically unsaturated compound in the initial cure or to char or discolor the final product. The temperature of gelling and curing, of course, will vary dependent upon such factors as size, thickness of the body to be formed and the temperature of reaction. Usually a period of 5 minutes to 2 hours is sufficient. However, it is easy to determine by hardness tests or by mere observation when the articles are cured to a hard, clear state.

It will be appreciated that many of the vinylic compounds such as styrene or the like which may be employed in the preparation of copolymerizable mixtures in accordance with the provisions of the present invention, as sold commercially, contain small amounts of inhibitors of gelation, in order to admit of storage and shipment thereof without premature gelation or polymerization. Commonly quinone or hydroquinone is employed for such purpose but others may be included. Such commerical vinylic compounds containing a small amount of stabilizer of conventional type may be employed in the preparation of the mixtures herein disclosed. Usually, the amount of inhibitor so introduced into the mixture is relatively small, since the vinylic compound is only a part of the mixture. Also the amount of inhibitors still present in the vinylic compound may have been substantially depleted during storage before it is admixed with the polyester. Accordingly, this stabilizer introduced through the monomer is not objectionable and the 3-hydrocarbon substituted catechols can be added directly thereto. However, if so desired, it can be removed from commercial styrene or similar vinylic compounds by distillation or other appropriate technique.

The proportions of the several components of the copolymerizable mixtures, prior to catalyzation, may be within approximately the following ranges:

|  | Parts by weight |
|---|---|
| Vinylic monomer | 10 to 60 |
| Unsaturated polyester | 40 to 90 |
| 3-hydrocarbon substituted catechol | 0.001 to 2 |

When these mixtures are to be cured, it is preferred to add an organic peroxide catalyst such as benzoyl peroxide in an amount of about .01 to 5% by weight.

For purposes of demonstrating the effectiveness of the catechols containing a hydrocarbon substituent in the 3-position, a series of tests were conducted in which standard mixtures were prepared and were then stabilized by addition of the 3-substituted catechols.

The copolymerizable mixture employed in this test was of the following composition: polyester—60 parts by weight. This polyester was of propylene glycol which had been reacted with a mixture of maleic acid and phthalic acid respectively in the proportions of 9 moles and 11 moles. To this polyester was added 25 parts by weight of styrene and the mixture was stabilized with the inhibitors in the amounts hereinafter designated.

Before the tests, the stabilized mixtures were admixed with 1.0% by weight of benzoyl peroxide as a standard catalyst. A series of samples were then prepared and the following tests were conducted: a socalled "tank life" test at 100° F. and 77° F. was performed. In this test, the mixture was simply stored at the temperatures indicated and the time for gelation in hours was observed and is recorded in the appended table under the appropriate temperature headings.

Tests to determine rate of cure and the change in the rate of cure with lapse of time was conducted upon the catalyzed mixtures and has been designated in the table under the heading of LPE which is a test of the rate of cure. It designates the time in minutes required for the temperature of the sample to pass from 150° F. to its maximum value. In determining this value, 11 to 12 gram samples of the copolymerizable mixture containing 1.0% of benzoyl peroxide as a polymerization catalyst were introduced into a test tube of 16 millimeters diameter. The depth of solution in such tube was approximately 3 inches. A conventional thermocouple was then introduced at the center of the tube to a depth of about 1 inch from the bottom. The tube with the thermocouple appropriately connected to a recording potentiometer was inserted in a water bath at about 180° F. and the recording apparatus was started. The temperature within the tube increased to that of the bath, but owing to the generation of exothermic heat, continued upwardly to a maximum which has been termed the "peak exotherm." The LPE values are recorded as the time in minutes for the mixture to rise from 150° F. to the "peak exotherm" and is an excellent indicator of the rate of cure of the mixture.

In the table, LPE values in the first column are recorded for the mixtures immediately upon the addition of the catalysts and are indicated under the heading "0" (zero hours). LPE values are also recorded for "24" (hours) and "48" (hours) and the changes from the corresponding readings at zero ("0") hours are an indication of the "drift" in the curing rate of the resins. Of course, it is desirable that this drift be as small as possible. The catechols containing a hydrocarbon in the 3-position meet this requirement surprisingly well.

In the table, the columns indicated $I_{100}$ and $I_{77}$ are the data obtained by dividing the "tank life" in hours as recorded under the headings "100° F." and "77° F." respectively by the LPE value at zero hours. The values under the headings $I_{100}$ and $I_{77}$ are indices of the efficiency of the compounds as tank life stabilizers of the copolymerizable mixture.

The data for the several tests is tabulated as follows:

| Inhibitor | L. P. E. | | | Tank Life | | $I_{100}$ | $I_{77}$ |
|---|---|---|---|---|---|---|---|
|  | 0 | 24 | 48 | 100° F | 77° F |  |  |
| 0.02% 3-propyl catechol | 3.25 | 3.15 | 3.0 | 28 | 132 | 8.6 | 40.5 |
| 0.03% 3-propyl catechol | 3.6 | 3.6 | 3.3 | 32 | 160 | 8.9 | 44.5 |
| 0.04% 3-propyl catechol | 4.2 | 4.0 | 3.5 | 36 | 228 | 8.6 | 54.0 |
| 0.015% 3-methyl catechol | 3.45 | 3.1 | 2.95 | 19 | 120 | 5.5 | 34.8 |
| 0.020% 3-methyl catechol | 3.8 | 3.7 | 3.1 | 21 | 130 | 5.5 | 34.2 |
| 0.025% 3-methyl catechol | 3.9 | 3.85 | 3.45 | 25 | 144 | 6.4 | 36.7 |
| 0.03% 3-n-amyl catechol | 5.0 | 4.7 | 4.3 | 34 | 170 | 6.8 | 34.0 |
| 0.04% 3-n-amyl catechol | 5.7 | 5.45 | 4.65 | 40 | 192 | 7.1 | 33.7 |
| 0.02% 3-isopropylcatechol | 4.9 | 4.9 | 4.7 | 42 | 288 | 8.6 | 58.8 |
| 0.03% 3-isopropylcatechol | 5.7 | 5.5 | 4.9 | 52 | 336 | 9.1 | 59.0 |
| 0.04% 3-isopropylcatechol | 7.1 | 7.05 | 6.5 | 84 | 420 | 11.8 | 59.3 |
| 0.04% 3-alpha-phenethyl catechol | 6.65 | 6.1 | 5.5 | 54 | 336 | 8.1 | 50.5 |

The copolymerizable mixtures such as the one above described are well adapted for use in the manufacture of castings, laminations and similar bodies. A mixture of ethylenically unsaturated alpha beta dicarboxylic acid polyester and a polymerizable ethylenic compound can be appropriately stabilized with the catechols substituted in the 3-position for any reasonable periods of storage before and after the addition of the catalyst. When it is desired to effect a cure of the catalyzed mixtures, the latter can be poured, or otherwise introduced into molds of any convenient design and there subjected to cure by appropriate heating. Sheets of fibrous material can also be impregnated with the copolymerizable mixtures and the sheets can then be cured by passing them between heated rollers or under radiant heaters or other heating devices in order to cure the resins into hard, thermoset state. The copolymerizable mixtures, appropriately catalyzed, can also be applied to surfaces of various types including wood, metal, paper and the like and there subjected to cure by radiant heat or by pressing against heated surfaces.

It will also be understood that the invention is applicable to the stabilization of other polymerizable unsaturated alkyd resins including those disclosed in U. S. Letters Patent Nos. 2,443,736 to 2,443,741 inclusive as well as in the other Letters Patent referred to above.

The following examples concretely illustrate the application of the principles of the invention:

EXAMPLE I

A polyester was prepared from the following mixture:

|  | Moles |
|---|---|
| Maleic acid | 2 |
| Phthalic acid | 3 |
| Propylene glycol | 4.1 |
| Diethylene glycol | 1.4 |

It will be observed that the sum of moles of the two glycols was in slight excess of that of the dicarboxylic acids.

The reaction was of conventional type in the preparation of polyesters. The polyester formed was formulated with the other reactants as follows:

|  | Parts by weight |
|---|---|
| Polyester | 78 |
| Styrene | 22 |
| 3-isopropyl catechol | 0.012 |

The mixtures so formulated can be stored for long periods of time without gelation. When it is desired to cure them, a catalyst such as benzoyl peroxide in an amount of 1% by weight or thereabouts can be added. It is desirable that the catalyzed mixture remain stabilized until it is actually heated. The stability of the catalyzed mixtures at storage temperature is termed "tank life." This, for certain applications, should be high. The above catalyzed mixture was subjected to tank life tests, the results of which are as follows:

|  | Hours |
|---|---|
| Tank life at 100° F | 15 to 19 |
| Tank life at 77° F | 79 to 83 |

A sample of the material in the glass test tube cured rapidly in a water bath at 180° F. to form a hard resin. The product passes from a liquid state at 150° F. to a hard, solid state within 5.3 minutes. Such product can be further hardened by baking at higher temperatures, for example 250° F. and above.

Curing ranges from 100 to 350° F. are contemplated. The period of time required will usually be within the range of 5 minutes to 2 hours dependent upon such factors as temperature, hardness desired in the finished product and the size of the article to be formed. The curing reaction is exothermic and in large castings the temperature will rise when reaction is initiated. If the temperature rises unduly, appropriate cooling can be applied.

The use of the invention is not limited to the formation of castings. The stabilized mixtures are very effective for impregnating webs and bats of fibrous materials such as cotton fabric or fabrics of glass fibers and the like. The webs may be impregnated by dipping in a solution or mixture of the polymerizable composition. Likewise it is permissible to coat the surface of a web or sheet with the compositions and then to cure the coating by heat or by irradiation with ultraviolet light. The use of filled compositions, that is compositions containing pulverulent fillers such as wood flour, titanium dioxide, finely divided calcium carbonate and many other materials which are non-reactive with respect to the resin is contemplated.

EXAMPLE II

In this example, propylene maleate phthalate was prepared by heating:

|  | Moles |
|---|---|
| Maleic anhydride | 3 |
| Phthalic anhydride | 2 |
| Propylene glycol | 5 to 6 |

This polyester free of monomer could be stabilized with a 3-substituted catechol such as 3-isopropyl catechol as herein disclosed. However, it is usually preferred to admix the polyester with an appropriate monomer or polymerizable ethylenically unsaturated compound such as styrene. In this example, Polyester, 67 parts
Styrene, 33 parts were admixed with 0.013 part of 3-isopropyl catechol
(Parts as given are by weight)

This mixture, like the one described in Example I, could be stored at ordinary atmospheric temperatures for long periods of time. In order to cure the mixture, it was admixed with 1.7% benzoyl peroxide. Samples of such catalyzed material were stable at 100° F. for 10 hours and at 77° F. were stable for 7 days.

A small amount of the catalyzed mixture was placed in a test tube which was placed in a water bath heated to a good curing temperature, namely 180° F. The mixture set to a gel or resin within 3.6 minutes. It is a hard resin when cooled. The mixtures so formulated can be introduced into molds and cured at temperatures of 100 to 350° F. to form hard, durable bodies.

This catalyzed mixture, like the others described, can be employed for impregnating fibrous bodies or for coating such bodies and when so employed, they can be cured by irradiation or by heating.

EXAMPLE III

Propylene maleate phthalate from a mixture of:

Maleic acid, 9 moles
Phthalic acid, 11 moles
Propylene glycol in a 10 to 20% excess of equivalency with respect to the acid components.

Eighty-four parts by weight of this mixed polyester was admixed with 16 parts of styrene and 0.017 part of 3-isopropyl catechol. The mixture had good storage properties in the absence of catalysts. To prepare a readily polymerizable mixture, 1% of benzoyl peroxide was added. The mixture when so catalyzed was stable for 55 hours at 100° F. and for 9 days at 77° F.

A small sample of this mixture was introduced into a test tube and the test tube was inserted in a water bath at 180° F. The temperature rose rapidly and apparently the cure was initiated at about 150° F. The mixture set within 5.5 minutes after the temperature of 150° F. was attained. This mixture like the others, could be employed for coating fibrous materials. The material can be admixed with inert fillers.

EXAMPLE IV

In this example a polyester of equal moles of phthalic acid and maleic acid was prepared. The glycol was propylene glycol which was employed in a molar excess of about 10 to 20%. A copolymerizable mixture comprising:

67 parts by weight of polyester
33 parts by weight of styrene and
0.013 part by weight of isopropyl catechol was formulated. The mixture in the absence of catalyst was storable over long periods of time. To prepare a readily copolymerizable mixture, 1.5% of benzoyl peroxide was added. The catalyzed mixture at 100° F. was stable for 31 hours. At 77° F. it was stable for 83 hours. The catalyzed mixture was readily curable to form hard, resinous bodies.

In a test of curing rate conducted upon the mixture immediately after catalyzation, the sample in a small test tube inserted in a water bath at 180° F. was converted into a hard clear resin in 4.8 minutes after the cure started and which was assumed to begin when the temperature attained approximately 150° F. In a similar test conducted 24 hours later, the cure to a hard resin state was attained in 4.5 minutes. After 48 hours, cure was attained in 3.8 minutes. The liquid mixture, like those previously described, can be employed for impregnating or coating webs of fibrous materials or admixing with non-reactive fillers.

EXAMPLE V

A mixed polyester of:

9 moles maleic acid
11 moles phthalic acid and
10 to 20% excess of propylene glycol;

was prepared. 6,121 pounds of polyester were admixed with 2,400 pounds of styrene and 405 grams of 3-isopropyl catechol to provide a stable mixture. Samples of this mixture were tested for polymerizability and "tank life." In the test, 1% of benzoyl peroxide was added. In the "tank life" tests, the catalyzed mixture withstood storage at 100° F. for 22 to 26 hours. At 77° F. it was stable for 180 hours. The mixture containing the catalyst when freshly prepared in a test tube in a water bath at 180° F. cured to a resinous state in 4.9 minutes. After 24 hours, it cured to a similar state in the same bath in 4.9 minutes. After 48 hours, curing time was 4.7 minutes. The curing times are those required to pass from 150° F. to hard resinous state at peak exotherm. The cures are remarkably uniform throughout the period of storage.

EXAMPLE VI

In this example, a polyester of the same composition disclosed in Example V was prepared. A polymerizable mixture comprising 1,284 pounds of polyester, 274 pounds of styrene and 128 grams of 3-isopropyl catechol was formulated. The mixture was stable at room temperature for a long period of time. In order to test the so-called tank life and the rate of cure of the mixture, 1% of benzoyl peroxide was added to samples thereof. A sample so catalyzed, at 100° F. was stable for 66 to 70 hours. A similar sample, at 77° F. was stable for 11 days.

A sample when freshly prepared and placed in a test tube in a water bath at 180° F. passed from the liquid state at 150° F. to a hard resinous state in 5.25 minutes. After 48 hours, 5.15 minutes was required. These cures are remarkably uniform and the tank life of the mixtures is excellent.

EXAMPLE VII

The polyester in this example was the same as that employed in Example V. A copolymerizable mixture of 6,026 pounds of the polyester, 3,040 pounds of styrene and 405 grams of 3-isopropyl catechol was prepared. The mixture was stable during normal periods of storage. When 1% by weight of benzoyl peroxide was added, it had a tank life of 37 to 41 hours at 100° F. At 77° F., a tank life of 9 days was obtained. For purposes of curing samples of the mixture, 1% of benzoyl peroxide was added thereto. The mixture was placed in a small test tube which was placed in the water bath at 180° F. The temperature rose to 150° F. and the mixture then cured to a hard resin in a period of 5.4 minutes. The mixture, like the others, can be employed for coating and impregnating sheets and webs of fibrous or other materials. It is also receptive to non-reactive fillers such as wood flour and the others herein described.

EXAMPLE VIII

A polyester which was of the same composition as that employed in Example V was prepared. A copolymerizable mixture comprising 60 parts by weight of polyester, 25 parts by weight of styrene and 0.009% by weight of 3-methyl catechol was prepared. The so-called tank life of the mixture at 100° F. was 19 hours. At 77° F., it was 120 hours. Small samples of the mixture were placed in a test tube in the water bath at 180° F. The fresh mixture passed from liquid state at 150° F. to hard, resinous state within 3.45 minutes. After 24 hours, the mixture cured in similar manner in 3.1 minutes. After 48 hours, the cure was effected in 2.95 minutes.

EXAMPLE IX

In this example, 0.018% by weight of 3-n-amyl catechol was substituted for 3-methyl catechol in Example VIII. The tank life at 100° F. was 34 hours and at 77° F. was 170 hours. The initial cure in the bath at 180° F. was 5 minutes. After 24 hours, the curing time was 4.7 minutes. After 48 hours, the curing time was 4.3 minutes.

In the several examples, benzoyl peroxide has been designated as a catalyst. Obviously other of the common peroxide type catalysts can be employed in a like capacity. These include tertiary butyl peroxide, tertiary butyl hydroperoxide, lauroyl peroxide and many others familiar to the art. In some cases, as for example where the polymerizable mixtures can be irradiated with ultraviolet light catalysts, can be dispensed with.

I claim:

1. A polymerizable composition comprising predominantly a polyester of an ethylenically unsaturated polycarboxylic acid and a polyhydric alcohol, and from about .01 to 1.0% by weight of 3-isopropyl catechol.

2. A polymerizable composition comprising (A) 50 to 90 per cent by weight of a polyester of an ethylenically unsaturated, alpha, beta-dicarboxylic acid and a dihydric alcohol, and (B) 10 to 50 per cent by weight of a polymerizable, ethylenically unsaturated compound, and (C) from about .01 to 1.0% by weight of 3-isopropyl catechol.

3. A polymerizable composition comprising (A)

50 to 90 per cent by weight of a polyester of a mixture of polycarboxylic acids, one of which is an ethylenically unsaturated, alpha, beta-dicarboxylic acid and one of which is free of ethylenic and acetylenic unsaturation, and a dihydric alcohol, and (B) 10 to 50 per cent by weight of a polymerizable, ethylenically unsaturated compound, and (C) from about .01 to 1.0% by weight of 3-isopropyl catechol.

4. The polymerizable composition of claim 3 wherein the polyester component is a polyester of maleic acid, phthalic acid and propylene glycol, and the polymerizable, ethylenically unsaturated compound is styrene.

5. The method of stabilizing a polymerizable composition comprising predominantly a polyester of an ethylenically unsaturated polycarboxylic acid and a polyhydric alcohol, which comprises adding to said polymerizable composition from about .01 to 1.0% by weight of 3-isopropyl catechol.

6. The method of stabilizing a polymerizable composition comprising (A) 50 to 90 per cent by weight of a polyester of an ethylenically unsaturated, alpha,beta-dicarboxylic acid and a dihydric alcohol, and (B) 10 to 50 per cent by weight of a polymerizable, ethylenically unsaturated compound, which comprises adding to said polymerizable composition from about .01 to 1.0% by weight of 3-isopropyl catechol.

7. The method of stabilizing a polymerizable composition of (A) 50 to 90 per cent by weight of a polyester of a mixture of polycarboxylic acids, one of which is an ethylenically unsaturated, alpha,beta-dicarboxylic acid and one of which is free of ethylenic and acetylenic unsaturation, and a dihydric alcohol, and (B) 10 to 50 per cent by weight of a polymerizable, ethylenically unsaturated compound, which comprises adding to said composition from about .01 to 1.0% by weight of 3-isopropyl catechol.

8. The method of claim 7 wherein the polyester component is a polyester of maleic acid, phthalic acid and propylene glycol, and the polymerizable, ethylenically unsaturated compound is styrene.

References Cited in the file of this patent

UNITED STATES PATENTS

| Number | Name | Date |
|---|---|---|
| 2,181,102 | Stoesser et al. | Nov. 21, 1939 |
| 2,457,657 | Glick | Dec. 28, 1948 |